United States Patent
Park et al.

(10) Patent No.: US 10,211,482 B2
(45) Date of Patent: Feb. 19, 2019

(54) ELECTROLYTE FOR LITHIUM SECONDARY BATTERY AND LITHIUM SECONDARY BATTERY EMPLOYING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Hosang Park, Seoul (KR); Jinah Seo, Cheongju-si (KR); Dongyoung Kim, Yongin-si (KR); Yoonsok Kang, Yongin-si (KR); Jungjoo Cho, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 211 days.

(21) Appl. No.: 14/982,838

(22) Filed: Dec. 29, 2015

(65) Prior Publication Data
US 2016/0190648 A1 Jun. 30, 2016

(30) Foreign Application Priority Data
Dec. 30, 2014 (KR) ........................ 10-2014-0194331

(51) Int. Cl.
H01M 10/0567 (2010.01)
H01M 10/052 (2010.01)
H01M 10/0568 (2010.01)
H01M 10/0569 (2010.01)
H01M 4/36 (2006.01)

(52) U.S. Cl.
CPC ....... H01M 10/0567 (2013.01); H01M 4/366 (2013.01); H01M 10/052 (2013.01); H01M 10/0568 (2013.01); H01M 10/0569 (2013.01)

(58) Field of Classification Search
CPC ......... H01M 10/0567; H01M 10/0568; H01M 10/0569; H01M 10/052; H01M 4/366
See application file for complete search history.

(56) References Cited

U.S. PATENT DOCUMENTS

| | | | |
|---|---|---|---|
| 7,102,725 B2 | 9/2006 | Moriyama | |
| 7,796,236 B2 | 9/2010 | Tawaraya et al. | |
| 8,415,056 B2 | 4/2013 | Koh et al. | |
| 8,871,384 B2 | 10/2014 | Koh et al. | |
| 2011/0195317 A1 | 8/2011 | Koh et al. | |
| 2015/0037668 A1* | 2/2015 | Iwaya | H01M 10/0569 429/200 |

FOREIGN PATENT DOCUMENTS

| | | |
|---|---|---|
| JP | 2004-301933 A | 10/2004 |
| JP | 2004-301934 A | 10/2004 |
| JP | 4416991 B2 | 12/2009 |
| JP | 2010-086914 A | 4/2010 |
| JP | 2010-086915 A | 4/2010 |
| JP | 2010-146740 A | 7/2010 |
| KR | 2004-0018096 A | 3/2004 |
| KR | 2015-0006703 A | 1/2015 |
| WO | 2008-096729 A1 | 8/2008 |
| WO | 2010-004952 A1 | 1/2010 |
| WO | 2010-013739 A1 | 2/2010 |
| WO | 2010-110290 A1 | 9/2010 |
| WO | WO 2013/183719 | * 12/2013 |

OTHER PUBLICATIONS

Katsuhiko Naoi et al. "Discharge Behavior and Rate Performances of Lithium-Ion Batteries in Nonflammable Hydrofluoroethers(II)", Journal of the Electrochemical Society, 157 (2) A190-A195 (2010).

* cited by examiner

*Primary Examiner* — Laura Weiner
(74) *Attorney, Agent, or Firm* — Cantor Colburn LLP

(57) ABSTRACT

An electrolyte for a lithium secondary battery, the electrolyte including: a lithium salt, an organic solvent, and an organic fluorinated ether compound represented by Formula 1:

$$CF_3-R_1-O-CF_2-CHF-(CH_2)_n-CF_3 \quad \text{Formula 1}$$

wherein, in Formula 1, $R_1$ is a C1-C10 alkylene group, a C3-C10 cycloalkylene group, a C1-C10 fluorinated alkylene group, or a C3-C10 fluorinated cycloalkylene group; and n is an integer of 0 to 10.

18 Claims, 2 Drawing Sheets

ELECTROLYTE FOR LITHIUM SECONDARY BATTERY AND LITHIUM SECONDARY BATTERY EMPLOYING THE SAME

CROSS-REFERENCE TO RELATED APPLICATION

This application claims priority to and the benefit of Korean Patent Application No. 10-2014-0194331, filed on Dec. 30, 2014, in the Korean Intellectual Property Office, the content of which is incorporated herein in its entirety by reference.

BACKGROUND

1. Field

The present disclosure relates to an electrolyte for a lithium secondary battery and a lithium secondary battery including the electrolyte, and more particularly, to an electrolyte for a lithium secondary battery including an organic fluorinated ether compound having a specific structure, and a lithium secondary battery including the electrolyte.

2. Description of the Related Art

Recently, lithium secondary batteries have drawn significant attention as power sources for small portable electronic devices. Lithium batteries using an organic electrolyte have greater energy density and a discharge voltage about twice that of batteries using an aqueous alkali electrolyte.

In lithium batteries, lithium-transition metal oxides, such as $LiCoO_2$, $LiMn_2O_4$, $LiNi_{1-x}Co_xO_2$ (wherein $0<x<1$), which have a structure that allows intercalation of lithium ions, are mainly used as cathode active materials. Various forms of carbonaceous materials, including artificial graphite, natural graphite, hard carbon, silicon, or a combination thereof, which allow intercalation and deintercalation of lithium ions, have been used as anode active materials.

KR 2004-0018096 discloses an electrolyte including an organic fluorinated ether compound with a high oxidation voltage as an electrolyte solvent, and useful in a high-voltage lithium secondary battery. According to the above-identified patent document, the organic fluorinated ether compound may have a high oxidation voltage and flame retardancy, and may reduce a low-temperature resistance of the lithium secondary battery.

However, there still remains a need for a novel organic fluorinated ether compound with further improved performance compared to conventional organic fluorinated ether compounds.

SUMMARY

Provided is an electrolyte for a lithium secondary battery, the electrolyte including an organic fluorinated ether compound having a specific structure.

Provided is a lithium secondary battery including the electrolyte.

Additional aspects will be set forth in part in the description which follows and, in part, will be apparent from the description, or may be learned by practice of the presented exemplary embodiments.

According to an aspect of an exemplary embodiment, an electrolyte for a lithium secondary battery includes:
a lithium salt;
an organic solvent, and
an organic fluorinated ether compound represented by Formula 1:

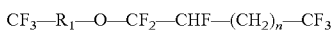

$$CF_3-R_1-O-CF_2-CHF-(CH_2)_n-CF_3 \qquad \text{Formula 1}$$

wherein, in Formula 1,
$R_1$ is a C1-C10 alkylene group, a C3-C10 cycloalkylene group, a C1-C10 fluorinated alkylene group, or a C3-C10 fluorinated cycloalkylene group; and
n is an integer of 0 to 10.

The organic fluorinated ether compound may have a boiling point of about 60° C. or greater.

The amount of the organic fluorinated ether compound may be from about 5 percent by weight to about 70 percent by weight based on a total weight of the electrolyte.

An anion of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or a combination thereof.

A concentration of the lithium salt may be from about 0.6 moles per liter to about 2.0 moles per liter.

The organic solvent of the electrolyte may be any organic solvents in common use for electrolytes of lithium secondary batteries in the art. For example, the organic solvent may be an ether solvent, an ester solvent, an amide solvent, a linear carbonate solvent, or a cyclic carbonate solvent, which may be used alone or in combination of at least two thereof.

According to an aspect of another exemplary embodiment, a lithium secondary battery includes:
a cathode,
an anode, and
an electrolyte according to any one of the above-described embodiments, disposed between the cathode and the anode.

The anode may have a film formed on a surface thereof, wherein the film may be derived from an organic fluorinated ether compound represented by Formula 1 as described above.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
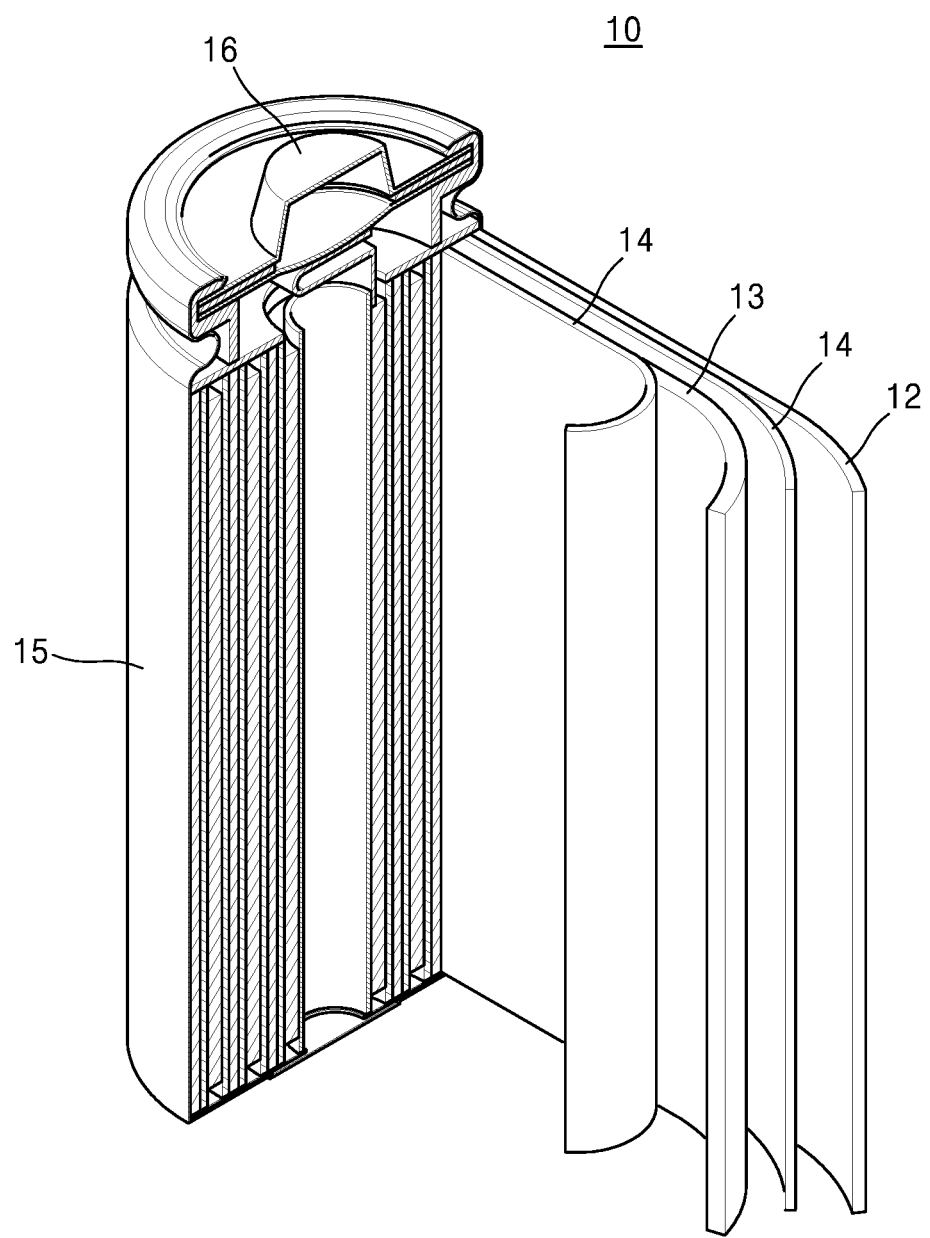
FIG. 1 is a schematic view illustrating a lithium secondary battery according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As used herein, the term "alkylene group" refers to a completely saturated, branched or unbranched (or a straight or linear) hydrocarbon group.

Non-limiting examples of the "alkylene group" include a methyl group, an ethyl group, an n-propyl group, an iso-propyl group, an n-butyl group, an iso-butyl group, a sec-butyl group, an n-pentyl group, an iso-pentyl group, a neo-pentyl group, an iso-amyl group, an n-hexyl group, a 3-methylhexyl group, a 2,2-dimethylpentyl group, a 2,3-dimethylpentyl group, and an n-heptyl group.

As used herein, the term "substituted alkylene group" refers to an alkylene group in which a hydrogen atom is substituted with a non-hydrogen substituent (a halogen atom, a C1-C6 alkyl group, a C3-C6 cycloalkyl group, a C1-C6 alkoxy group, a C6-C10 aryl group, an oxygen atom, a sulfur atom, a nitrogen atom, and the like).

As used herein, the term "fluorinated alkylene group" refers to an alkylene group in which at least one hydrogen atom is substituted with a fluorine atom.

As used herein, the term "substituted fluorinated alkylene group" refers to a fluorinated alkylene group in which a hydrogen atom is substituted with a non-hydrogen substituent (a halogen atom, a C1-C6 alkyl group, a C3-C6 cycloalkyl group, a C1-C6 alkoxy group, a C6-C10 aryl group, an oxygen atom, a sulfur atom, a nitrogen atom, and the like).

As used herein, the term cycloalkylene group" refers to a divalent group having one or more saturated or partially saturated rings in which all ring members are carbon.

Non-limiting examples of the "cycloalkylene group" include a cyclopropylene group, a cyclopropylmethylene group, a cyclobutylene group, a cyclobutylene group, a cyclopentylene group, a cyclopentenylene group, a cyclohexylene group, a cyclohexenylene group, a cycloheptylene group, a cycloheptenylene group, a cyclooctylene group, a cyclooctenylene group, and an adamantylene group.

As used herein, the term "substituted cycloalkylene group" refers to a cycloalkylene group in which a hydrogen atom is substituted with a non-hydrogen substituent (a halogen atom, a C1-C6 alkyl group, a C3-C6 cycloalkyl group, a C1-C6 alkoxy group, a C6-C10 aryl group, an oxygen atom, a sulfur atom, a nitrogen atom, and the like).

As used herein, the term "fluorinated cycloalkylene group" refers to a cycloalkylene group in which at least one hydrogen atom is substituted with a fluorine atom.

As used herein, the term "substituted fluorinated cycloalkylene group" refers to a fluorinated cycloalkylene group in which a hydrogen atom is substituted with a non-hydrogen substituent (a halogen atom, a C1-C6 alkyl group, a C3-C6 cycloalkyl group, a C1-C6 alkoxy group, a C6-C10 aryl group, an oxygen atom, a sulfur atom, a nitrogen atom, and the like). As used herein, the term "aryl group" refers to a group having at least one aromatic ring in which all ring members are carbon.

Non-limiting examples of the "aryl group" include a phenyl group and a naphthyl group.

When a group containing a specified number of carbon atoms is substituted with any of the groups listed in the preceding paragraphs, the number of carbon atoms in the resulting "substituted" group is defined as the sum of the carbon atoms contained in the original (unsubstituted) group and the carbon atoms (if any) contained in the substituent. For example, when the term "substituted $C_1$-$C_{10}$ alkyl" refers to a $C_1$-$C_{10}$ alkyl group substituted with $C_6$-$C_{10}$ aryl group, the total number of carbon atoms in the resulting aryl substituted alkyl group is $C_7$-$C_{20}$.

As used herein, the term "halogen atom" refers to a fluorine atom, a bromine atom, a chlorine atom, or an iodine atom.

As used herein, the term "discharging" refers to a deintercalation process of lithium ions from an anode, and the term "charging" refers to an intercalation process of lithium ions into the anode.

Hereinafter, embodiments of an electrolyte for a lithium battery and a lithium secondary battery including the electrolyte will be described in greater detail.

According to an aspect of the present disclosure, an electrolyte for a lithium secondary battery includes a lithium salt, an organic solvent, and an organic fluorinated ether compound represented by Formula 1.

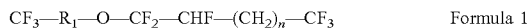

$$CF_3-R_1-O-CF_2-CHF-(CH_2)_n-CF_3 \quad \text{Formula 1}$$

In Formula 1, $R_1$ is a substituted or unsubstituted C1-C10 alkylene group, a substituted or unsubstituted C3-C10 cycloalkylene group, a substituted or unsubstituted C1-C10 fluorinated alkylene group, or a substituted or unsubstituted C3-C10 fluorinated cycloalkylene group; and n is an integer of 0 to 10.

Due to suppressed decomposition at high voltage of the organic fluorinated ether compound, a lithium secondary battery including the organic fluorinated ether compound as an electrolyte ingredient (for example, an electrolyte solvent) may have improved lifetime.

The organic fluorinated ether compound is added to the electrolyte to prevent decomposition reaction on a surface of an anode and form a stable solid electrolyte interface (SEI) membrane at an interface between the anode and the electrolyte. Thus, the organic fluorinated ether compound may improve stability of the lithium secondary battery.

In Formula 1, n may be 0 or 1.

The organic fluorinated ether compound may include at least one of compounds represented by Formulae 2 to 11:

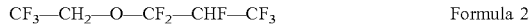
$$CF_3-CH_2-O-CF_2-CHF-CF_3 \quad \text{Formula 2}$$

$$CF_3-CHF-CH_2-O-CF_2-CHF-CF_3 \quad \text{Formula 3}$$

$$CF_3-CF_2-CH_2-O-CF_2-CHF-CF_3 \quad \text{Formula 4}$$

$$CF_3-CH_2-O-CF_2-CHF-CH_2-CF_3 \quad \text{Formula 5}$$

$$CF_3-CHF-CH_2-O-CF_2-CHF-CH_2-CF_3 \quad \text{Formula 6}$$

$$CF_3-CHF-CHF-O-CF_2-CHF-CH_2-CF_3 \quad \text{Formula 7}$$

$$CF_3-CHF-CF_2-O-CF_2-CHF-CH_2-CF_3 \quad \text{Formula 8}$$

$$CF_3-CF_2-CH_2-O-CF_2-CHF-CH_2-CF_3 \quad \text{Formula 9}$$

$$CF_3-CF_2-CHF-O-CF_2-CHF-CH_2-CF_3 \quad \text{Formula 10}$$

$$CF_3-CF_2-CF_2-O-CF_2-CHF-CH_2-CF_3. \quad \text{Formula 11}$$

The organic fluorinated ether compound may have a boiling point of about 60° C. or greater. While not wishing to be bound by theory, it is understood that when the organic fluorinated ether compound has a boiling point within this range, gasification of the organic fluorinated ether compound during operation of the lithium secondary battery may be prevented.

The amount of the organic fluorinated ether compound may be from about 5 percent by weight (wt %) to about 70 wt % based on a total weight of the electrolyte. While not wishing to be bound by theory, it is understood that when the amount of the organic fluorinated ether compound is within this range, a lithium secondary battery with improved capacity and lifetime characteristics and reduced low-temperature resistance may be obtained.

A concentration of the lithium salt may be from about 0.6 moles per liter of the solution (M) to about 2.0 M, and in some embodiments, from about 0.7 M to about 1.6 M. While not wishing to be bound by theory, it is understood that when the concentration of the lithium salt is within these ranges (0.6 M-2.0 M), the electrolyte may have improved performance due to high conductivity and may have improved mobility of lithium ions due to an appropriate viscosity. The lithium salt may be any lithium salts in common use for electrolytes of lithium secondary batteries in the art. For example, an anion of the lithium salt may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or a combination thereof.

The organic solvent of the electrolyte may be any organic solvents in common use for electrolytes of lithium secondary batteries in the art. For example, the organic solvent may be an ether solvent, an ester solvent, an amide solvent, a linear carbonate solvent, or a cyclic carbonate solvent, which may be used alone or in combination of at least two thereof.

A representative example of the organic solvent of the electrolyte may include a cyclic carbonate solvent, a linear carbonate solvent, or a combination thereof. Non-limiting examples of the cyclic carbonate solvent include ethylene carbonate (EC), propylene carbonate (PC), 1,2-butylene carbonate, 2,3-butylene carbonate, 1,2-pentylene carbonate, 2,3-pentylene carbonate, vinylene carbonate, a halide thereof, or a combination thereof. Non-limiting examples of the linear carbonate solvent include dimethyl carbonate (DMC), diethyl carbonate (DEC), dipropyl carbonate, ethyl methyl carbonate (EMC), methyl propyl carbonate, ethyl propyl carbonate, or a combination thereof.

Ethylene carbonate (EC) and propylene carbonate (PC) as cyclic carbonates available as the organic solvent of the electrolyte are high-viscosity organic solvents with a high dielectric constant and thus may facilitate dissociation of the lithium salt in the electrolyte. Such a cyclic carbonate may be mixed with a linear carbonate, such as dimethyl carbonate (DMC) and diethyl carbonate (DEC), having low viscosity and low dielectric constant in an appropriate ratio to prepare an electrolyte having high electric conductivity.

Non-limiting examples of the ether solvent available as the organic solvent include dimethyl ether, diethyl ether, dipropyl ether, methylethyl ether, methyl propyl ether, ethyl propyl ether, or a combination thereof.

Non-limiting examples of the ester solvent available as the organic solvent include methyl acetate, ethyl acetate, propyl acetate, methyl propionate, ethyl propionate, propyl propionate, γ-butyrolactone, γ-valerolactone, γ-caprolactone, σ-valerolactone, ε-caprolactone, or a combination thereof.

Non-limiting examples of the amide solvent available as the organic solvent include N,N-dimethylformamide (DMF), N,N-dimethylacetamide (DMA), N-methyl-2-pyrrolidone (NMP), or a combination thereof.

The electrolyte for a lithium secondary battery may further include a conventional additive to form a solid electrolyte interface (SEI) membrane within the scope of the objective of the present inventive concept. Non-limiting examples of the additive to form the SEI membrane include vinylene carbonate, vinyl ethylene carbonate, fluoroethylene carbonate, a cyclic sulfite, a saturated sultone, an unsaturated sultone, an acyclic sulfone, or a combination thereof.

Non-limiting examples of the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or a combination thereof. Non-limiting examples of the saturated sultone may include 1,3-propane sultone, 1,4-butane sultone, or a mixture thereof. Non-limiting examples of the unsaturated sultone may include ethene sultone, 1,3-propene sultone, 1,4-butene sultone, 1-methyl-1,3-propene sultone, or a combination thereof. Non-limiting examples of the acyclic sulfone may include divinyl sulfone, dimethyl sulfone, diethyl sulfone, methylethyl sulfone, methylvinyl sulfone, or a combination thereof.

The amount of the additive to form an SEI membrane may be appropriately chosen according to a type of the additive. For example, the amount of the additive to form an SEI membrane may be from about 0.01 parts by weight to about 10 parts by weight based on a total weight of the electrolyte for a lithium secondary battery.

According to another aspect of the present disclosure, a lithium secondary battery includes an electrolyte according to any of the above-described embodiments.

For example, the lithium secondary battery may be manufactured by injecting an electrolyte according to any of the above-described embodiments into an electrode assembly including a cathode, an anode, and a separator disposed between the cathode and the anode. The cathode and the anode may be each manufactured by mixing an active material, a binder, and a conducting agent with a solvent to prepare a slurry, coating the slurry on a current collector such as aluminum, and drying and pressing the resulting product.

The cathode active material may include a lithium-containing transition metal oxide. Non-limiting examples of the cathode active material may include $Li_xCoO_2$ (wherein $0.5<x<1.3$), $Li_xNiO_2$ (wherein $0.5<x<1.3$), $Li_xMnO_2$ (wherein $0.5<x<1.3$), $Li_xMn_2O_4$ (wherein $0.5<x<1.3$), $Li_x(Ni_aCo_bMn_c)O_2$ (wherein $0.5<x<1.3$, $0<a<1$, $0<b<1$, $0<c<1$, and $a+b+c=1$), $Li_xNi_{1-y}Co_yO_2$ (wherein $0.5<x<1.3$ and $0<y<1$), $Li_xCo_{1-y}Mn_yO_2$ (wherein $0.5<x<1.3$ and $0 \le y<1$), $Li_xNi_{1-y}Mn_yO_2$ (wherein $0.5<x<1.3$ and $0 \le y<1$), $Li_x(Ni_aCo_bMn_c)O_4$ (wherein $0.5<x<1.3$, $0<a<2$, $0<b<2$, $0<c<2$, and $a+b+c=2$), $Li_xMn_{2-z}Ni_zO_4$ (wherein $0.5<x<1.3$, $0<z<2$), $Li_xMn_{2-z}Co_zO_4$ (wherein $0.5<x<1.3$ and $0<z<2$), $Li_xCoPO_4$ (wherein $0.5<x<1.3$), $Li_xFePO_4$ (wherein $0.5<x<1.3$), or a combination thereof. The lithium-containing transition metal oxide may be coated with a metal such as aluminum (Al) or a metal oxide. Alternatively, the cathode active material may include a lithium-containing transition metal sulfide, a lithium-containing transition metal selenide, a lithium-containing transition metal halide, or a combination thereof, in addition to or in place of the lithium-containing metal oxide.

Typical examples of the anode active material may include a carbonaceous material, a lithium metal, silicon, or tin that allows intercalation and deintercalation of lithium ions. For example, a metal oxide such as $TiO_2$, $SnO_2$, or the like having a potential of less than 2 V with respect to lithium may also be used as the anode active material. For example, the anode active material may be a carbonaceous material, including a low-crystalline carbon and a high-crystalline carbon. Representative examples of the low-crystalline carbon are soft carbon and hard carbon. Representative examples of the high-crystalline carbon are high-temperature sintered carbon, such as natural graphite, artificial graphite, kish graphite, pyrolytic carbon, mesophase pitch based carbon fiber, meso-carbon microbeads, mesophase pitches, and petroleum or coal tar pitch derived cokes.

The binder may bind the active material and a conducting agent together to fix them to a current collector. The binder may be any binders in common use for lithium secondary batteries, for example, polyvinylidene fluoride, polypropylene, carboxymethylcellulose, polyvinylpyrrolidone, tetrafluoroethylene, polyethylene, polyvinyl alcohol, or styrene butadiene rubber.

Non-limiting examples of the conducting agent may include artificial graphite; natural graphite; acetylene black; ketjen black; channel black; lamp black; thermal black; conductive fibers such as carbon fibers and metallic fibers; conductive metal oxides such as titanium oxide; and metal powders such as aluminum or nickel.

Non-limiting examples of the separator may include a single olefin such as polyethylene (PE) and polypropylene (PP), an olefin composite, polyamide (PA), polyacrylonitrile (PAN), polyethylene oxide (PEO), polypropylene oxide (PPO), polyethylene glycol diacrylate (PEGA), polytetrafluoroethylene (PTFE), polyvinylidene fluoride (PVdF), or polyvinyl chloride (PVC).

The lithium secondary battery according to an embodiment may have any shape, for example, a cylindrical type using a can, a rectangular type, a pouch type, or a coin type.

FIG. 1 is a schematic view illustrating a lithium secondary battery 10 according to an embodiment.

Referring to FIG. 1, the lithium secondary battery 10 may include a cathode 13, an anode 11, and a separator 12.

The cathode 13, the anode 11, and the separator 12 may be rolled or folded and then be accommodated in a battery case 14, followed by injecting an electrolyte (not shown) into the battery case 14 and sealing with a cap assembly 15, thereby completing manufacture of the lithium secondary battery 10. The battery case 14 may be a cylindrical, rectangular, or thin-film type. For example, the lithium secondary battery 10 may be a large thin-film battery.

One or more embodiments of the present disclosure will now be described in detail with reference to the following examples. However, these examples are only for illustrative purposes and are not intended to limit the scope of the one or more embodiments of the present disclosure.

Example 1

Preparation of Electrolyte 15 percent by weight (wt %) of fluoroethylene carbonate (FEC), 32 wt % of dimethyl carbonate (DMC), 39 wt % of 1,1,2,3,3,3-hexafluoropropyl 2,2,2-trifluoroethyl ether (HFPTFEE), and 14 wt % of $LiPF_6$ as a lithium salt were mixed together to obtain an electrolyte containing 1.3 molar (M) of $LiPF_6$.

Manufacture of Cylindrical Cell and Coin Cell $Li_{1.2}Ni_{0.13}Co_{0.13}Mn_{0.54}O_2$(OLO) as a cathode active material, polyvinylidene fluoride (PVDF) as a binder, and Denka black as a conducting agent were mixed in a weight ratio of about 92:4:4 to obtain a solid mixture. This solid mixture was dispersed in N-methyl-2-pyrrolidone (NMP) to prepare a cathode active material layer composition. The cathode active material layer composition was coated on an aluminum foil having a thickness of about 15 micrometers (μm), dried in an oven set at about 90° C. for about 2 hours, and then further dried in a vacuum oven at about 120° C. for about 2 hours to completely evaporate a solvent. The resulting product was then pressed and punched, thereby manufacturing a cathode.

The cathode, a silicon anode (manufactured using a silicon-carbon composite anode active material according to Korean Patent Application 2013-0080493), a polypropylene separator (available from Teijin Co., Ltd.), and the electrolyte prepared in Example 1 as described above were used to manufacture a 18650 cylindrical cell and a 2032 coin cell.

Comparative Example 1

Preparation of Electrolyte 22 wt % of fluoroethylene carbonate (FEC), 43 wt % of diethyl carbonate (DEC), 20 wt % of ethylene carbonate (EC), and 15 wt % of $LiPF_6$ as a lithium salt were mixed to prepare an electrolyte containing 1.3 M of $LiPF_6$.

Manufacture of Cylindrical Cell and Coin Cell

A cylindrical cell and a coin cell were manufactured in the same manner as in Example 1, except that the electrolyte prepared in Comparative Example 1 as described above, instead of the electrolyte of Example 1, was used.

Evaluation Example 1: Evaluation of Specific Capacity and Capacity Retention

A charge-discharge test was performed using the cylindrical cells of Example 1 and Comparative Example 1 in the following manner.

First, each of the cylindrical cells was charged at about 25° C. with a constant current of about 0.05 Coulomb (C) to a voltage of about 4.55 V, and then discharged with a constant current of about 0.05 C to a discharge voltage of about 2.0 V (First cycle of formation process).

Next, each of the cylindrical cells was charged at about 25° C. with a constant current of about 0.1 C to a voltage of about 4.55 V, and then discharged with a constant current of about 0.1 C to a discharge voltage of about 2.0 V (Second cycle of formation process). This cycle was repeated one more (Third cycle of formation process).

The cylindrical cell after the formation process was charged at about 25° C. with a constant current of about 1 C to a voltage of about 4.55 V, and then discharged with a constant current of about 1 C to a discharge voltage of about 2.0 V, followed by discharge capacity measurement. This discharge capacity was recorded as a $1^{st}$ cycle discharge capacity or an initial capacity. This charge and discharge cycle was repeated 100 times.

A discharge capacity measured at every cycle was recorded as a specific capacity. The results are shown in FIG. 2.

Figure 2:
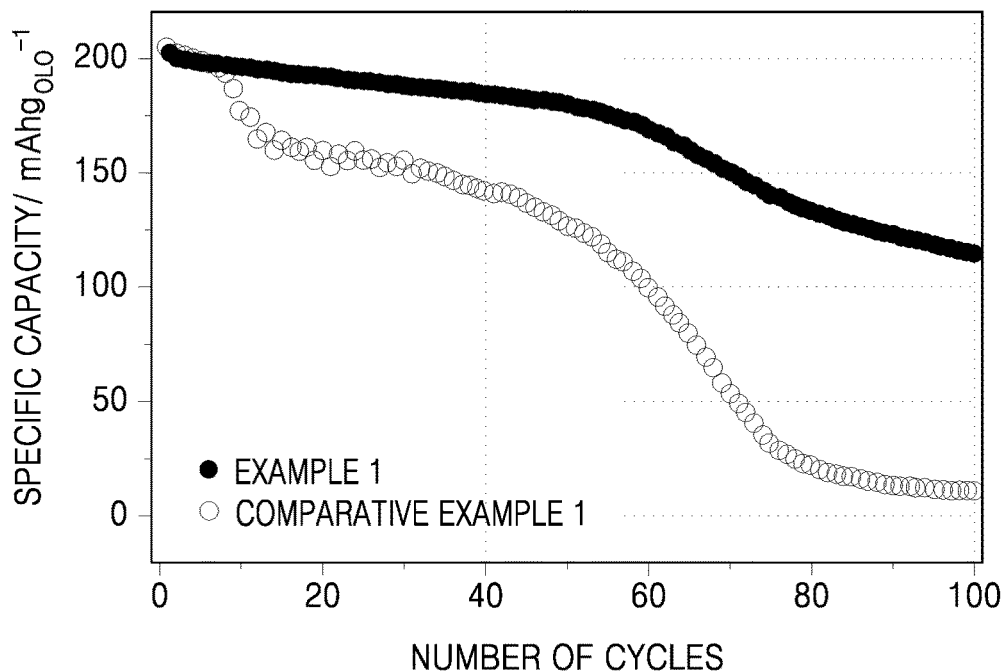
FIG. 2 is a graph of specific capacity (milliampere hours per gram, mA·h/g) versus number of cycles illustrating specific capacity characteristics of cylindrical cells of Example 1 and Comparative Example 1.

Referring to FIG. 2, the cylindrical cell of Example 1 was found to have a smaller width of decrease in specific capacity with respect to the number of cycles compared to the cylindrical cell of Comparative Example 1.

A capacity retention of each cylindrical cell was calculated based on the discharge capacity measured at each cycle using Equation 1. The specific capacities and capacity retentions at $100^{th}$ cycle of the cylindrical cells of Example 1 and Comparative Example 1 are represented in Table 1.

Capacity retention (%)=($100^{th}$-cycle discharge capacity/$1^{st}$-cycle discharge capacity)×100      Equation 1

TABLE 1

| Example | Specific capacity(mA · hg$^{-1}$) @$100^{th}$ cycle | Capacity retention (%) @$100^{th}$ cycle |
|---|---|---|
| Example 1 | 114.7 | 56.7 |
| Comparative Example 1 | 10.8 | 5.3 |

Referring to Table 1, the cylindrical cell of Example 1 was found to have a higher specific capacity and a higher capacity retention at $100^{th}$ cycle compared to those of the cylindrical cell of Comparative Example 1.

Evaluation Example 2: Low-Temperature Resistance Evaluation

Figure 3:
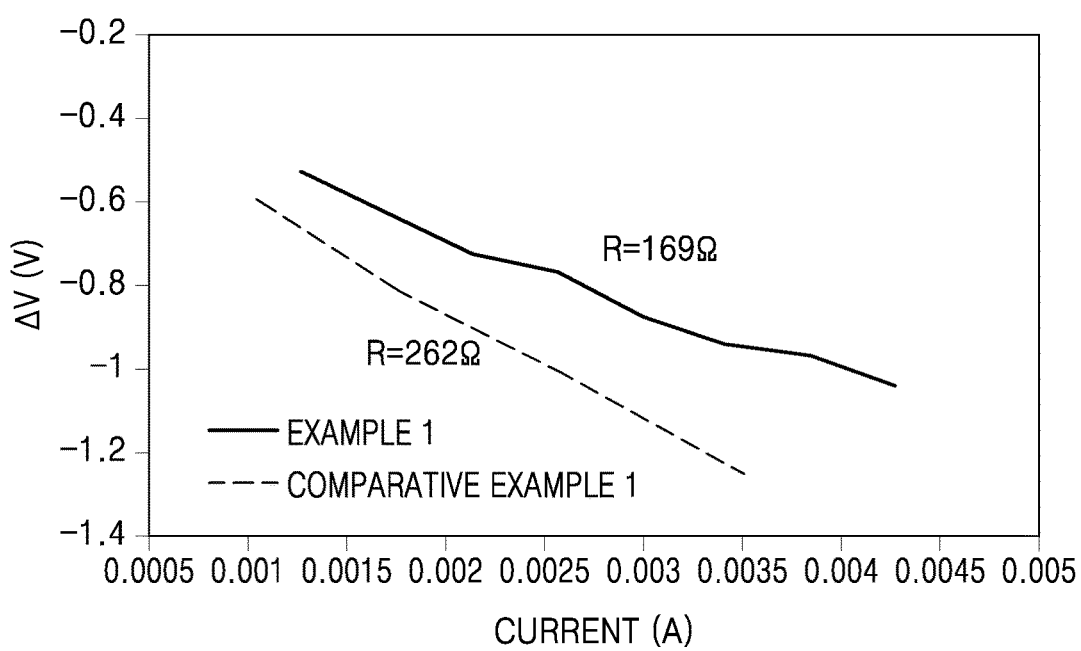
FIG. 3 is a graph of voltage drop (volts, V) versus current (amperes, A), illustrating low-temperature resistance characteristics in coin cells of Example 1 and Comparative Example 1.

A charge-discharge test was performed at −25° C. on the coin cells of Example 1 and Comparative Example 1 with varying C-rate. A voltage drop (ΔV) at each C-rate was measured. The results are shown in FIG. 3. An average slope in a graph of voltage drop with respect to current in FIG. 3 was calculated and recorded as a low-temperature resistance. As used herein, the term "C-rate" as a discharge rate of a coin cell refers to a value obtained by dividing a total discharge capacity of the coin cell by a total discharge time of the coin cell.

Referring to FIG. 3, the coin cell of Example 1 was found to have a significantly smaller low-temperature resistance compared to that of the coin cell of Comparative Example 1, indicating that the coin cell of Example 1 has improved low-temperature output characteristics compared to the coin cell of Comparative Example 1.

As described above, according to the one or more embodiments, an electrolyte for a lithium secondary battery, including an organic fluorinated ether compound of Formula 1, may improve capacity characteristics and lifetime characteristics of a lithium secondary battery including the electrolyte, and may reduce low-temperature resistance.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. An electrolyte for a lithium secondary battery, the electrolyte comprising:
   a lithium salt;
   an organic solvent, and
   an organic fluorinated ether compound represented by Formulae 1, 3, 6 to 8, and 10-11:

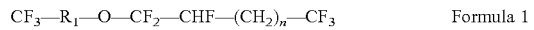

wherein, in Formula 1,
   $R_1$ is a C1-C10 alkylene group, a C3-C10 cycloalkylene group, a C1-C10 fluorinated alkylene group, or a C3-C10 fluorinated cycloalkylene group; and
   n is an integer of 2 to 10,

$$CF_3-CHF-CHF-O-CF_2-CHF-CH_2-CF_3 \quad \text{Formula 7}$$

$$CF_3-CHF-CF_2-O-CF_2-CHF-CH_2-CF_3 \quad \text{Formula 8}$$

$$CF_3-CF_2-CHF-O-CF_2-CHF-CH_2-CF_3 \quad \text{Formula 10}$$

$$CF_3-CF_2-CF_2-O-CF_2-CHF-CH_2-CF_3. \quad \text{Formula 11}$$

2. The electrolyte of claim 1, wherein the organic fluorinated ether compound has a boiling point of about 60° C. to about 200° C.

3. The electrolyte of claim 1, wherein the amount of the organic fluorinated ether compound is from about 5 percent by weight to about 70 percent by weight based on a total weight of the electrolyte.

4. The electrolyte of claim 1, wherein an anion of the lithium salt comprises $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or a combination thereof.

5. The electrolyte of claim 1, wherein a concentration of the lithium salt may be from about 0.6 moles per liter to about 2.0 moles per liter.

6. The electrolyte of claim 1, wherein the organic solvent comprises an ether solvent, an ester solvent, an amide solvent, a linear carbonate solvent, a cyclic carbonate solvent, or a combination thereof.

7. The electrolyte of claim 6, wherein the ether solvent comprises dimethyl ether, diethyl ether, dipropyl ether, methylethyl ether, methyl propyl ether, ethyl propyl ether, or a combination thereof.

8. The electrolyte of claim 6, wherein the ester solvent comprises methyl acetate, ethyl acetate, propyl acetate, methyl propionate, ethyl propionate, propyl propionate, γ-butyrolactone, γ-valerolactone, γ-caprolactone, σ-valerolactone, ε-caprolactone, or a combination thereof.

9. The electrolyte of claim 6, wherein the amide solvent comprises N,N-dimethylformamide, N,N-dimethylacetamide, N-methyl-2-pyrrolidone, or a combination thereof.

10. The electrolyte of claim 6, wherein the linear carbonate solvent comprises dimethyl carbonate, diethyl carbonate, dipropyl carbonate, ethyl methyl carbonate, methyl propyl carbonate, ethyl propyl carbonate, a halide thereof, or a combination thereof.

11. The electrolyte of claim 6, wherein the cyclic carbonate solvent comprises ethylene carbonate, propylene carbonate, 1,2-butylene carbonate, 2,3-butylene carbonate, 1,2-pentylene carbonate, 2,3-pentylene carbonate, vinylene carbonate, a halide thereof, or a combination thereof.

12. The electrolyte of claim 1, wherein the electrolyte further comprises an additive to form a solid electrolyte interface membrane, the additive comprising vinylene carbonate, vinyl ethylene carbonate, fluoroethylene carbonate, a cyclic sulfite, a saturated sultone, an unsaturated sultone, an acyclic sulfone, or a combination thereof.

13. The electrolyte of claim 12, wherein the cyclic sulfite is ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or a combination thereof.

14. The electrolyte of claim 12,
wherein the saturated sultone is 1,3-propane sultone, 1,4-butane sultone, or a combination thereof, and
wherein the unsaturated sultone is ethene sultone, 1,3-propene sultone, 1,4-butene sultone, 1-methyl-1,3-propene sultone, or a combination thereof.

15. The electrolyte of claim 12, wherein the acyclic sulfone is divinyl sulfone, dimethyl sulfone, diethyl sulfone, methylethyl sulfone, methylvinyl sulfone, or a combination thereof.

16. The electrolyte of claim 12, wherein an amount of the additive to form a solid electrolyte interface membrane is from about 0.01 parts by weight to about 10 parts by weight based on a total weight of the electrolyte for a lithium secondary battery.

17. A lithium secondary battery comprising:
a cathode;
an anode; and
the electrolyte according to claim 1, disposed between the cathode and the anode.

18. The lithium secondary battery of claim 17, further comprising a film disposed on a surface of the anode, wherein the film comprises an organic fluorinated ether compound represented by Formula 1.

* * * * *